(12) United States Patent
Potts

(10) Patent No.: US 7,309,434 B2
(45) Date of Patent: Dec. 18, 2007

(54) APPARATUS AND METHOD FOR WASTEWATER TREATMENT

(76) Inventor: David A. Potts, 385 Roast Meat Hill Rd., Killingworth, CT (US) 06419

( * ) Notice: Subject to any disclaimer, the term of this patent is extended or adjusted under 35 U.S.C. 154(b) by 70 days.

(21) Appl. No.: 11/168,706

(22) Filed: Jun. 28, 2005

(65) Prior Publication Data
US 2005/0284811 A1 Dec. 29, 2005

Related U.S. Application Data

(60) Provisional application No. 60/650,182, filed on Feb. 4, 2005, provisional application No. 60/583,332, filed on Jun. 28, 2004.

(51) Int. Cl.
C02F 3/30 (2006.01)

(52) U.S. Cl. .............. 210/605; 210/617; 210/630; 210/150; 210/903

(58) Field of Classification Search ........... 210/605, 210/615, 617, 630, 150, 151, 903
See application file for complete search history.

(56) References Cited

U.S. PATENT DOCUMENTS

| 713,896 | A | 11/1902 | Maigen |
|---|---|---|---|
| 808,411 | A | 12/1905 | Venable |
| 2,071,591 | A | 2/1937 | Tholin |
| 2,200,580 | A | 5/1940 | Pruss |
| 2,308,866 | A | 1/1943 | Dekema |
| 2,463,464 | A | 3/1949 | Lind |
| 3,112,261 | A | 11/1963 | Porter |
| 3,293,174 | A | 12/1966 | Robjohns |
| 3,543,937 | A | 12/1970 | Choun |
| 3,846,289 | A | 11/1974 | Jeris |
| 4,100,073 | A | 7/1978 | Hopcroft |
| 4,201,663 | A | 5/1980 | Rollag |
| 4,256,573 | A | 3/1981 | Shimodaira |
| 4,333,893 | A | 6/1982 | Clyde |
| 4,351,729 | A | 9/1982 | Witt |
| 4,415,454 | A | 11/1983 | Fuchs |
| 4,427,548 | A | 1/1984 | Quick |
| 4,465,594 | A | 8/1984 | Laak |
| 4,482,458 | A | 11/1984 | Rovel |
| 4,490,258 | A | 12/1984 | Heijnen |

(Continued)

Primary Examiner—Christopher Upton
(74) Attorney, Agent, or Firm—Michael A. Blake

(57) ABSTRACT

A method for treating wastewater. The method comprises: providing a first dose of air to aerate a medium bed; supplying a dose of wastewater to the aerated medium bed; allowing nitrification of the wastewater to occur; allowing denitrification to occur; and providing a subsequent dose of air to the medium bed. A combined aerobic and anaerobic treatment apparatus. The apparatus comprises: a medium bed; a wastewater conduit in fluid communication with the medium bed; an air conduit in fluid communication with the medium bed; and where the combined aerobic and anaerobic treatment apparatus is configured to first allow a dose of wastewater in the medium bed to undergo a nitrification process which is generally aerobic, and then second allow the dose of wastewater in the medium bed to undergo a denitrification process which is generally anaerobic. An apparatus for treating wastewater. The apparatus comprises: means for providing a first dose of air to aerate a medium bed; means for supplying a dose of wastewater to the aerated medium bed; means for allowing nitrification of the wastewater to occur; means for allowing denitrification to occur; and means for providing a subsequent dose of air to the medium bed.

21 Claims, 7 Drawing Sheets

U.S. PATENT DOCUMENTS

| | | |
|---|---|---|
| 4,524,139 A | 6/1985 | Fuchs |
| 4,566,971 A | 1/1986 | Reimann |
| 4,576,718 A | 3/1986 | Reishcl |
| 4,655,925 A * | 4/1987 | Tabata et al. ............... 210/605 |
| 4,664,803 A | 5/1987 | Fuchs |
| 4,696,747 A * | 9/1987 | Verstraete et al. .......... 210/617 |
| 4,705,634 A | 11/1987 | Reimann |
| 4,735,724 A | 4/1988 | Chynoweth |
| 4,800,021 A | 1/1989 | Desbos |
| 4,810,377 A | 3/1989 | Kato |
| 4,871,450 A | 10/1989 | Goodrich |
| 4,895,645 A | 1/1990 | Zorich |
| 4,925,552 A | 5/1990 | Bateson |
| 4,983,299 A | 1/1991 | Lupton |
| 4,997,568 A | 3/1991 | Vandervelde |
| 5,019,268 A | 5/1991 | Rogalla |
| 5,049,265 A | 9/1991 | Boyd |
| 5,147,547 A | 9/1992 | Savall |
| 5,192,442 A * | 3/1993 | Piccirillo et al. ........... 210/903 |
| 5,217,616 A | 6/1993 | Sanyal |
| 5,227,051 A | 7/1993 | Oshima |
| 5,266,213 A | 11/1993 | Gillham |
| 5,308,490 A * | 5/1994 | Schroeder et al. .......... 210/605 |
| 5,314,621 A | 5/1994 | Rogalla |
| 5,330,651 A | 7/1994 | Robertson |
| 5,348,654 A * | 9/1994 | Fischer ...................... 210/151 |
| 5,403,487 A | 4/1995 | Lodaya |
| 5,458,779 A | 10/1995 | Odegaard |
| 5,487,829 A | 1/1996 | Safferman |
| 5,500,111 A | 3/1996 | Fujino |
| 5,580,770 A | 12/1996 | DeFillipi |
| 5,609,754 A | 3/1997 | Stuth |
| 5,645,725 A | 7/1997 | Zitzelsberger |
| 5,766,475 A | 6/1998 | Mayer |
| 5,776,344 A | 7/1998 | McCarty |
| 5,863,433 A * | 1/1999 | Behrends .................... 210/150 |
| 5,980,739 A | 11/1999 | Jowett |
| 6,007,721 A | 12/1999 | Payraudeau |
| 6,086,765 A | 7/2000 | Edwards |
| 6,153,094 A | 11/2000 | Jowett |
| 6,183,643 B1 | 2/2001 | Goodley |
| 6,863,816 B2 * | 3/2005 | Austin et al. ............... 210/617 |
| 6,896,805 B2 * | 5/2005 | Austin ....................... 210/630 |
| 7,056,438 B2 * | 6/2006 | Austin ....................... 210/605 |
| 2003/0024874 A1* | 2/2003 | Wallace et al. ............. 210/617 |

* cited by examiner

APPARATUS AND METHOD FOR WASTEWATER TREATMENT

CROSS-REFERENCES

The present application claims the benefit of provisional patent application No. 60/583,332 filed on Jun. 28, 2004 by David A. Potts and claims the benefit of provisional patent application No. 60/650,182 filed on Feb. 4, 2005 by David A. Potts.

TECHNICAL FIELD

The present invention relates to the treatment of wastewater, and more particularly a method and apparatus for oxic and anoxic treatment of wastewater.

BACKGROUND

Different kinds of particulate medium-containing devices have been used for treatment of wastewater. Some types are intended primarily for chemical purification. Others are intended principally for physical straining of suspended solids.

For instance, in a typical sand filter, water is distributed continuously or intermittently on the top of a bed of sand having a depth of two feet or more. Sometimes, the water flows through the sand and directly into the underlying soil. Sometimes, drains at the bottom of the filter collect the water, so it can be flowed elsewhere. A filter may be created on or within the natural earth or it may be contained within a concrete, metal or plastic container. Shallow-bed sand filters of various types are used in combination with septic tanks for domestic and commercial wastewater.

Common silica sand or anthracite coal sand is commonly used as a medium. Typically the medium will have a maximum particle size of less than about 5 mm. Although water is often clarified upstream of sand filters to separate out entrained matter, there is still an undesirable tendency for organic matter to accumulate, especially near the top of the bed. The interstices amongst the grains of sand can be become largely blocked to passage of water, so that filter function is greatly reduced. Thus, to restore function, the bed may be backwashed, alternatively, the top surface of the bed is raked or replaced, and other times, all medium in the bed may be replaced.

A trickling filter is another kind of device, which is used for various purposes, including purifying wastewater, by action of microorganisms. Generally, a trickling filter is characterized by large particles and large interstices, compared to sand, with more resultant space within the medium. During use, wastewater is distributed on the top of the filter, so it passes over the medium and is subjected to action of microorganisms which populate the top surface of the medium, in what is often called a biofilm. Trickling filters may be operated in different ways with different oxygen concentrations. The microorganisms are most often predominantly aerobic. In special instances, predominately anaerobic, or facultative, microorganisms may be present.

A diversity of coarse mediums have been used for trickling filters. For instance, a manufactured medium may be comprised of molded or fractured ceramic pieces, or plastic objects. Often times the medium is hollow to create more surface area. Other mediums comprise wood chips, peat, stones, pieces of rigid or flexible plastic foams, strips, natural and synthetic fibers and mats, etc.

By its nature, a trickling bed filter will not filter suspended solids, even though some may incidentally adhere to the medium surfaces. From time to time, the biofilm sloughs off. Thus, some sort of settling chamber or pond, or a clarifier, is commonly positioned upstream and downstream of a trickling filter.

Air is often allowed, or forced, to circulate through a trickling bed filter. Depending on the spacing of the medium and the configuration of the vessel, there will be natural air circulation through the trickling bed filter. For example, see U.S. Pat. No. 3,542,937 to Choun and U.S. Pat. No. 2,293,174 to Robjohns. Forced airflow has been employed. See, for example, U.S. Pat. No. 2,308,866 to Dekema, which shows how air is flowed upwardly, counter to the down-flow direction of the wastewater. U.S. Pat. No. 2,200,580 to Pruss et al. and U.S. Pat. No. 5,980,739 to Jowett describe how air is flowed downwardly, or concurrently with the flow of water. U.S. Pat. Nos. 3,542,937; 2,293,174, 2,308,866; 2,200,580 and 5,980,739 are each hereby incorporated by reference in their entirety.

Being coarse, and having large interstitial spaces, the medium in a trickling bed filter generally will not retain much moisture when drained. One problem with trickling filters is that if excessive air is flowed through the medium between doses of wastewater, the biofilm within the medium, especially the macropores, can be dried out, and that can may result in death of the microbes, resulting in adverse performance when a wastewater dose is subsequently applied.

There are various criteria by which the usefulness of prior art devices are measured. They include the cost of medium and the container; the efficacy of the system, measured by the quality or degree of treatment; the efficiency, insofar as the volume of wastewater satisfactorily processed per unit time for a given size unit, economic investment and operating cost; the durability or lifecycle of the unit and medium; and, the reliability and maintenance requirement, including cleaning and renovation of the medium. There is a continuing search for improvements in particulate-containing devices which process wastewater.

SUMMARY

The disclosed method relates to treating wastewater. The method comprises: providing a first dose of air to aerate a medium bed; supplying a dose of wastewater to the aerated medium bed; allowing nitrification of the wastewater to occur; allowing denitrification to occur; and providing a subsequent dose of air to the medium bed.

The disclosed apparatus relates to a combined aerobic and anaerobic treatment apparatus. The apparatus comprises: a medium bed; a wastewater conduit in fluid communication with the medium bed; an air conduit in fluid communication with the medium bed; and where the combined aerobic and anaerobic treatment apparatus is configured to first allow a dose of wastewater in the medium bed to undergo a nitrification process which is generally aerobic, and then second allow the dose of wastewater in the medium bed to undergo a denitrification process which is generally anaerobic.

The disclosed apparatus also relates to an apparatus for treating wastewater. The apparatus comprises: means for providing a first dose of air to aerate a medium bed; means for supplying a dose of wastewater to the aerated medium bed; means for allowing nitrification of the wastewater to occur; means for allowing denitrification to occur; and means for providing a subsequent dose of air to the medium bed.

BRIEF DESCRIPTION OF THE DRAWINGS

The present disclosure will be better understood by those skilled in the pertinent art by referencing the accompanying drawings, where like elements are numbered alike in the several figures, in which.

DETAILED DESCRIPTION

Figure 1:
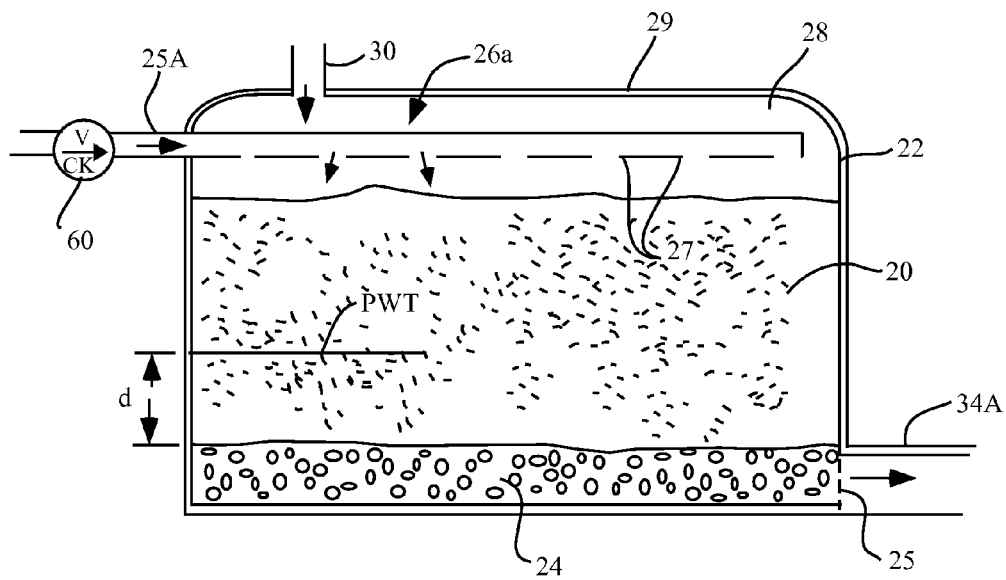
FIG. 1 shows a vessel containing a filter bed supported on a layer of gravel, with means for applying air pressure to the top of the filter bed.

In the invention, wastewater is deposited over time in doses on the top of a granular medium bed having special characteristics with respect to flow and retention of water. An exemplary medium has about 20-40% porosity and is comprised of particles sized between 0.3 and 3 mm. Air is flowed through the medium on a controlled and periodic basis, preferably in alternation with water doses. The medium is typically contained within a circumscribing container, such as solid wall chamber or a skirt membrane within soil, to prevent lateral or outward flow or air or water from the bed. In use, water flows into and through the interstices or pores of the medium, with sufficient volumes, water issues from the bottom of the bed. With certain preferred mediums, perched water will be present within the bed. Alternatively water can be encouraged to pond on top of the bed for a desired period of time. Water will pond due to a variety of reasons, including medium selection and the accumulation of organic matter and microorganisms on or near the surface of the bed. Subsequent downward airflow makes the perched water flow from the bottom of the bed. The downward airflow also dewaters the bed, if or at locations where there is no perched water. After a period of air flow, which may be steady or cyclic between on and off, water is dosed again. The cycle may be repeated endlessly, so long as there is wastewater to process.

While the medium used herein is chosen on an engineering basis, the technology for understanding the behavior of soil, particularly that relating to water and air content, and movement of such within, is largely relevant. Terminology and concepts from that discipline are used. See the textbook N. C. Brady & R. R. Weil "The Nature and Properties of Soils", 13th Ed. (2002), Prentice Hall, Upper Saddle River, N.J., US. See also "Soil Survey Manual", US Dept. of Agriculture Handbook No. 18 (1993). As used herein, the term "medium" without qualification refers to a mass of grains or particulates, such as, but not limited to sand. In other places the term "media" may be used, and herein is interchangeable for "medium". As used herein, absent an express statement to the contrary, the term water is shorthand and interchangeable for wastewater, and the term moisture is synonymous with water. It should be understood that wastewater includes residential wastewater, commercial wastewater, agricultural wastewater, or any water with a sufficient amount of ammonia. Biological processes which occur in the treatment of wastewater, and parameters such as biochemical oxygen demand (BOD) and the like, are described in U.S. Pat. No. 6,485,647, the disclosure of which at Columns 8 and 9 is hereby incorporated by reference. The invention may be characterized in terms of its effect on BOD5. It will be understood that BOD5 (or simply "BOD") is a concise way of stating the wastewater has been treated, and that corollary effects will be obtained. Thus, when BOD is reduced, and insofar as they are present, Chemical Oxygen Demand will be reduced, pathogens will be reduced, and nitrogen compounds may be oxidized (nitrified), etc., all as such processes are known to occur in effective aerobic wastewater treatment. (Often, the measure of chemical oxygen demand will be incorporated into the reported BOD, sometimes expressed as BCOD.) Reducing BOD and achieving the other types of alternations mentioned above are all aimed at making the wastewater more environmentally benign, so it may be ultimately re-introduced to natural water or otherwise re-used.

A typical apparatus of the present invention is shown in FIG. 1. A layer of granular medium 20 is located within container 22, supported by means such as a layer 24 of gravel or pea stone or other like media. In FIG. 1, the support layer 24 rests on the bottom of the vessel and is restrained from flowing out the exit pipe 34 by grating 25. Alternatively, gravel support layer 24 may rest on a horizontal grating spanning the bottom of the vessel. One or more collection pipes, not shown, may underlie or be within support layer 24.

Wastewater inflow pipe 25A provides water to distributor 26A, which has spaced apart nozzle openings 27, to deliver water onto the surface of medium bed 20, within volume 28 at the top of the container 22. During operation, an unshown air mover, such as but not limited to: a blower, fan, and pump connected to an air inflow pipe 30 delivers pressurized air to the vessel top volume 28. Compared to a trickling filter, the air pressure per unit bed depth is high and the air flow is low. Check valve 60 in the water inflow pipe 25A prevents the pressurized air from flowing back up the pipe 25A, toward the source of wastewater. Wastewater and air flow downwardly through the medium 20 and gravel support layer 24, and out exit pipe 34A, to atmosphere or soil. Other arrangements than valve 60 may be used, for preventing air from flowing up the inlet water line 25A. See the examples of such other plumbing configurations in U.S. Pat. No. 6,485,647, particularly FIG. 8-13 and related text, the entire disclosure which is hereby incorporated by reference.

Figure 2:
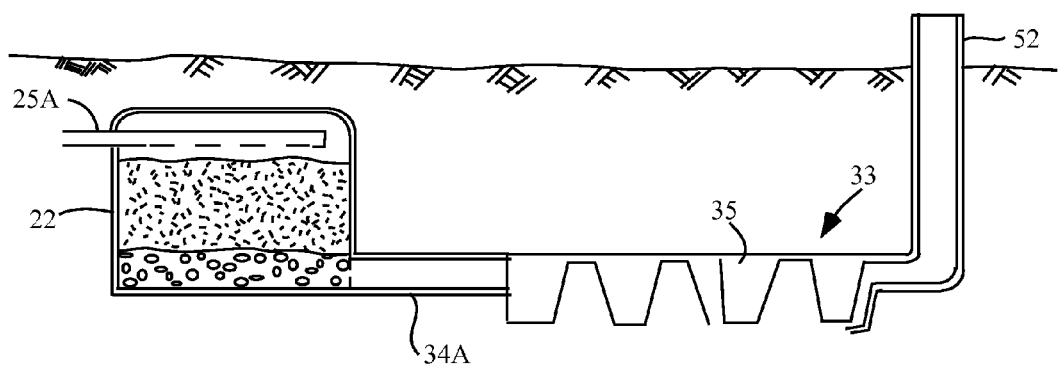
FIG. 2 shows the apparatus of FIG. 1 buried within soil and connected to a leach field.

Exit pipe 34A carries the processed wastewater to a suitable discharge point. Often, in the case of a residential dwelling type of system, the processed wastewater will be percolated into the soil by a leach field, such as one comprised of an array 33 of plastic leaching chambers 35, as are shown in FIG. 2. Air flowing out exit pipe 34A may pass through chambers 35, and then vent to atmosphere though vertical vent pipe 52. Alternatively, pipe 52 may be omitted and air may flow with the water into the leach field 33, so it diffuses and flows upwardly within the soil, to the surface and atmosphere. Still alternately, effluent gases may be piped from vessel 22 to devices, such as air diffusers buried in the soil, to reduce possibility of offensive odor emanation.

Figure 3:
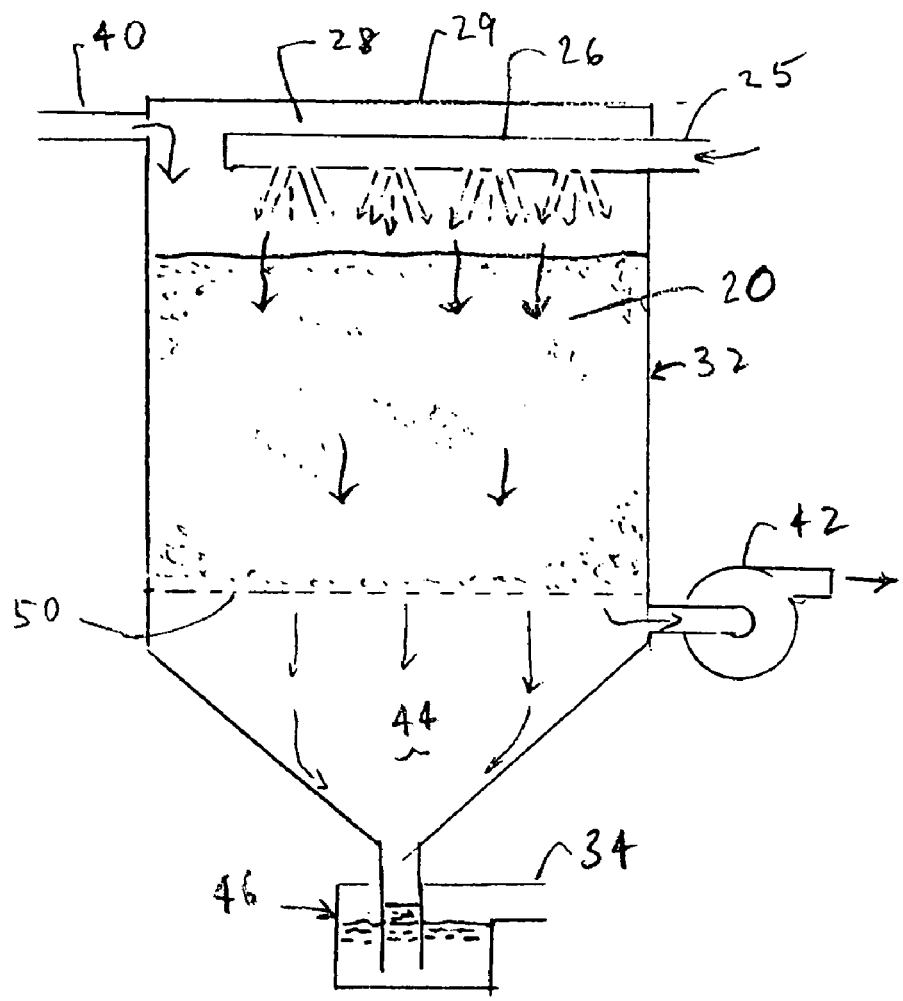
FIG. 3 shows a vessel containing a filter bed supported on a grid, where sub-atmospheric pressure is applied to the bottom of the vessel to pull air downwardly through the bed.

To carry out the processes that are described herein, air must be supplied to the volume 28 above the medium bed 20 and either be pushed or pulled downwardly through the medium bed, which preferably has a depth of about 6 inches to about 24 inches. FIG. 3 shows another apparatus, where the air is pulled through the medium bed 20. Sub-atmospheric pressure in space 44 at the bottom of the medium bed 20 is created by suction blower 42. The medium is supported on a grid 50 within vessel 32. The partial vacuum draws atmospheric air through the medium bed. The resultant low pressure at the top volume 28 draws in atmospheric air through air line 40 or directly from atmosphere above the bed. Wastewater is flowed onto the top of the medium bed by wastewater inflow line 25 and distributor 26. The water flows onto and through the bed 20, as indicated by the downward running arrows. Air flows similarly, when the blower is operational. Water which exits the bed flows to water trap 46 at the bottom of the vessel, and then out the exit pipe 34. The water trap design is sufficient to prevent the back flow of air into the low pressure space 44. Advantages of the FIG. 3 apparatus, over the FIG. 1 or 2 apparatuses, include that the top of the vessel 32 need not be sealed, and that no check valve is needed to prevent pressurized air from flowing backwards, up the wastewater inlet line 25. In the generality of this embodiment, the top 29 of vessel 32 need not be present and air and water may be flowed in by the same pipe.

The interstices, or orifice sizes, of the structure which supports the medium is chosen so it has large interstices compared to those of the bed, be the structure a grid 50, plate, screen, or layer 24 of coarser grained material. The reasons for this include that there should be substantially unimpeded water flow through the support, but at the same time, it is an aim to not affect the behavior of the bed as an element. For example, if the support layer is too fine, capillarity can affect how water passes through the bed. So, for example, when using quartz sand medium which is predominately about 0.3 mm to about 0.5 mm in particle size, a preferred support layer material is sand which is predominately about 2 mm to about 4 mm in particle size. Gravel graded layers of gravel may be used; or, a grate having slots about 0.3 mm to about 0.5 mm wide may be used. Coarser medium will have commensurately coarser support means.

Generally the wastewater treatment begins when a dose of water is introduced into the bed. In the preferred process, the dose, or water quantity, is substantially greater than the quantity of water which perches, if there is perching. Perching is described in more detail below. For example, the dose can be about 150% to about 500% of the quantity which perches in an about 0.5 to 6 inch deep perch water table. Depending on the medium and water quantity, water will flow out the bed bottom during or within a number of minutes after dosing ends. In a process which is less preferred from an economic (e.g., volume processed per day) standpoint, the dose is about 100% to about 150% of the quantity which perches.

In the absence of air flow: When there is perch water in the bed, the medium above the perch water table drains. When there is no perch water, the whole bed drains. The nature of the preferred medium used in the invention is such that a substantial quantity of water is retained in the medium, as described in connection with the data in Table C. Such water is retained due to phenomena which include physical capture and adhesion to the medium of the bed. As is well known, in the absence of forces beyond gravity, full drainage can take many hours, and the plot of water content with time will by asymptotic with a quantity which is commonly referred to as the field capacity of the bed.

After dosing, air is flowed downwardly through the medium. If there is perch water in the bed, most of that water is first pushed out of the bed. Airflow may be continuous, but is preferably intermittent. For example, a pause of about 60 minutes is followed by flow for about 30 minutes, followed by a pause of about 60 minutes, etc. If the air is run continuously, a small diminishing quantity of water will also flow from the bottom of the bed while the air flows. When airflow is paused and water is allowed to redistribute within the bed, as described, and then resumed, the re-initiation of airflow causes a visibly significant momentarily greater discharge of water from the bottom of the bed. More water is removed from the bed over a given period when the airflow is intermittent than when it is steady or continuous.

Airflow provides oxygen which diffuses into the significant water quantity which remains in the bed at any point in the airflow portion of the cycle. The oxygen in the air reinvigorates aerobic microorganisms, helps oxidize organic matter, and raises the oxygen content which was depleted by the previous dose of wastewater. As detailed below, the airflow quantity and time is substantially greater than might be theoretically required to satisfy the BOD of the water which is retained in the bed. If that practice is not followed, then over weeks or months the bed can tend to become progressively less permeable and less capable of being drained subsequently by gravity or airflow. Such clogging is thought to be due to accumulation of organic material in small interstices within the bed.

To push or pull air through the medium, a blower or other air mover having pressure and volume characteristics sufficient for the purpose is used. The air mover required will depend on the particular medium and the dimensions of the bed. As an example, the desired flow through a 12 inch thick bed of the Filpro No. 00 sand will be in the range of about 2 to about 20 standard cubic feet per hour (scfh) per square foot of bed surface area. Often, a regenerative type blower is a good choice. One example of a suitable blower type, for small cross section bed, is Model VFC084 (Fuji Electric Corporation of America, Saddle Brook, N.J., US).

In the practice of the invention, the desirable steady state airflow rate may vary considerably. The preferred airflow will be in the range about 2 to about 40 scfh per square foot of bed surface area. More preferably, flow rate will be in the range about 8 to about 20, most preferably about 12 to about 14 scfh/ft2. As a generality, to reduce energy consumption, it will be an aim to minimize the flow rate.

With reference to the above, the useful airflow volume is large, when compared to the volume of pore space in the bed. To illustrate, for a one cubic foot bed of Filpro No. 00 quartz particulate: The bed, at about 45% porosity, has about 0.4 $ft^3$ of pore space. (Filpro media is described below.) When air is flowed at about 2 to about 10 $ft^3$/hr for about 1 to about 5 hours, about 2 to about 50 $ft^3$ of air are passed through the bed. Thus the volume of air flowed through the bed is about 5 to about 125 times the volume of the pore space in the bed. That air volume to pore volume relationship is sometime characterized in terms of the number of times the air in the pores has been exchanged. In the example, changes range from about 5 to about 125. In the example, when the bed is one foot in cross sectional area and one foot deep, the airflow velocity is about 2 to about 10 ft/hr. In the generality of the invention the volume/changes ranges between about 5 and about 150 or more.

The dosing rate of wastewater in terms of gallons per day can be varied over a range. For example, with Filpro No. 00 medium and a 12 inch depth bed, water will typically be dosed at the rate of about 1 to about 20, more preferably about 1 to about 10, most preferably about 3 to about 10, gallons per day per square foot of bed horizontal cross sectional area (gpd/ft2). In the example, if daily flow rate is about 3 to about 4 gallons, water may be applied in four equally spaced-in-time doses of about 0.75 to about 1 gallons, and each dose preferably applied at the rate of about 0.2 to about 0.3 gallons per minute. Experiments with No. 00 medium and 180 mg/l BOD5 and 40 mg/l total nitrogen wastewater indicate that BOD and total nitrogen removal are a bit better for about 3 gpm/day than it is for about 1 gpm/day.

Obviously, higher through flows are desired for any bed, as an economic matter, but if the daily flow is too high the bed can be overwhelmed, even if there is BOD removal. When the bed is overwhelmed, there can be progressive clogging, and reduced through flow. When dose volume or dose rate becomes too high, significant loss of hydraulic and treatment capacity can result. When the bed is clogged, there will be persistent ponding and reduced acceptance of daily flow. A preferred way to operate a bed is to obtain a BOD5 of about 10 mg/l or less in the effluent—a removal of at least about 90 to about 95 percent, and in general to keep daily flow at the mid or lower ends of the ranges recited.

The following examples illustrate the invention.

EXAMPLE 1

Apparatus much like that shown in FIG. 1 was used. The vessel is a 48 inch diameter, 36 inch high cylinder made of stainless steel. The vessel has a cross section of about 10.3 square feet. A 12 inch deep filter bed is contained within the vessel. It is comprised of Filpro No. 00 quartz sand medium. The bed is supported on a 2 inch thick layer of Filpro No. 4 quartz sand, which is supported on a slotted metal plate. The sand bed holds about 37 gallons of liquid in the perched water. A regenerative blower is connected to the air inlet pipe of the vessel. In continuous operation, assuming a previous cycle, about 25 gallons of wastewater is dosed onto the top of the medium bed by spraying or other means. After a matter of some minutes, water flows to the bottom of the bed, due to the effects of gravity. That outflow rate will vary with time and the condition of the bed, e.g., how much water remained from the previous cycle. Generally, flow diminishes with time, e.g., over than the next 20-60 minutes. In this example, after about 20 minutes, the blower is turned on, and throttled, to create a differential pressure of about 7 inch water column (iwc) across the bed. Water, which was retained as the perched water of the bed, is forced through and out the bottom of the bed. The airflow is continued for about 2 hours, when the airflow is stopped. Another 25 gallon dose of wastewater is added, and the cycle is repeated. The BOD of wastewater at 180 mg/l will be typically reduced to less than about 20 mg/l.

The invention enhances the way in which oxygen diffuses or interacts with wastewater, and thus enhances the desired biochemical action. The better interchange of air/oxygen with water is inferred by an experiment using the foregoing apparatus and process, but with virgin medium and ordinary tap water (i.e., water with zero BOD). The input water had 4-5 ppm oxygen. The water flowing from the bed had 8-10 ppm oxygen.

EXAMPLE 2

Figure 4:
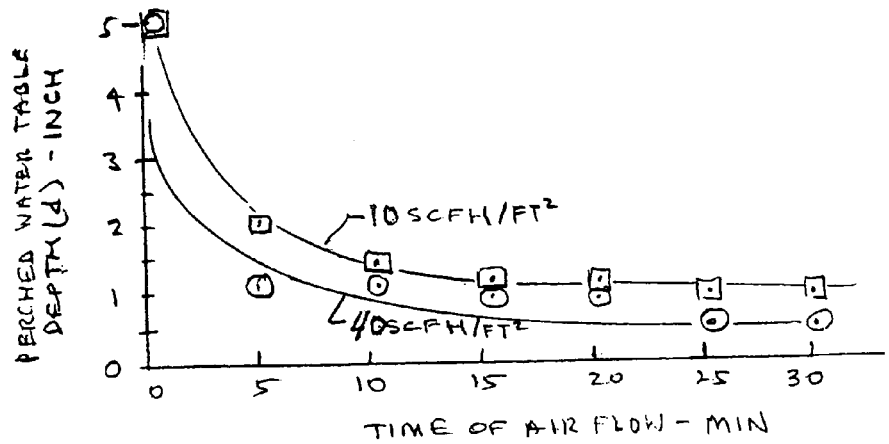
FIG. 4 graphically illustrates how perched water disappears when air is flowed through a filter bed.

The behavior of the perched water under air flow was observed in a 12 inch deep bed of Filpro No. 00 quartz in a transparent container, after dosing and draining. FIG. 4 shows the perch water table (PWT) measurements, and how depth d decreases with time. It is difficult to measure PWT elevation precisely, so the data should be considered in such context. In all instances, a substantial fraction of perched water is removed in a matter of minutes, after air starts to flow. Depth d decreases more rapidly with a 40 scfh/ft2 airflow rate than with a 10 scfh/ft2 rate. After about 15-30 minutes, the depth of perched water is 10-20% of the original depth and seems nearly asymptotic with the baseline. At such point, the bed may be considered substantially dewatered. Any drying effect of the air is considered inconsequential, given the small volume and drying capacity of the typical 5-30 scfh of air which flowed through in about 30 minutes, and a typical relative humidity in the 50-90% range.

EXAMPLE 3

The bed medium and depth were the same as in Example 1. The virgin medium bed, contained in an about 7 square inch cross-section cylinder, was first dosed with water and allowed to drain. That resulted in perched water of about 5-6 inch depth. Then, air was blown through the medium for 45 minutes. Referring to Table A, the first column shows the Bed Condition, the second column shows the bed weight at each condition. The third column shows that, after draining there was 343 g of water in the bed. Part of that is perched water and part is that water in the drained medium above the perched water table, which is about 5 inches of the 12 inch total bed depth. After 45 minutes air flow water, there remains 87 g of water, which water was retained within the 12 inch deep medium, none as perched water. Thus, at condition II, it can be calculated that the about 7 inches of medium which is above the perch water table holds 40 g of water, as shown in column 4. By difference, the perched water is about 300 g, or about 90% of all the water in the bed. The fourth column shows the water left in the Drained medium, and the fifth column shows the weight percentage of moisture in the medium.

TABLE A

Effect of dosing and airflow on weight of water in a medium bed.

| Bed Condition | Total Bed Weight g | Difference vs. Dry Bed g | Water in Drained Medium G | Weight % Moisture in Drained Medium |
|---|---|---|---|---|
| I. Dry | 3025 | 0 | 0 | — |
| II. Dosed, saturated and allowed to drain | 3368 | 343 | 40 | 10 |
| Dewatered by airflow for 45 minutes | 3112 | 87 | 87 | 3 |

EXAMPLE 4

Figure 5:
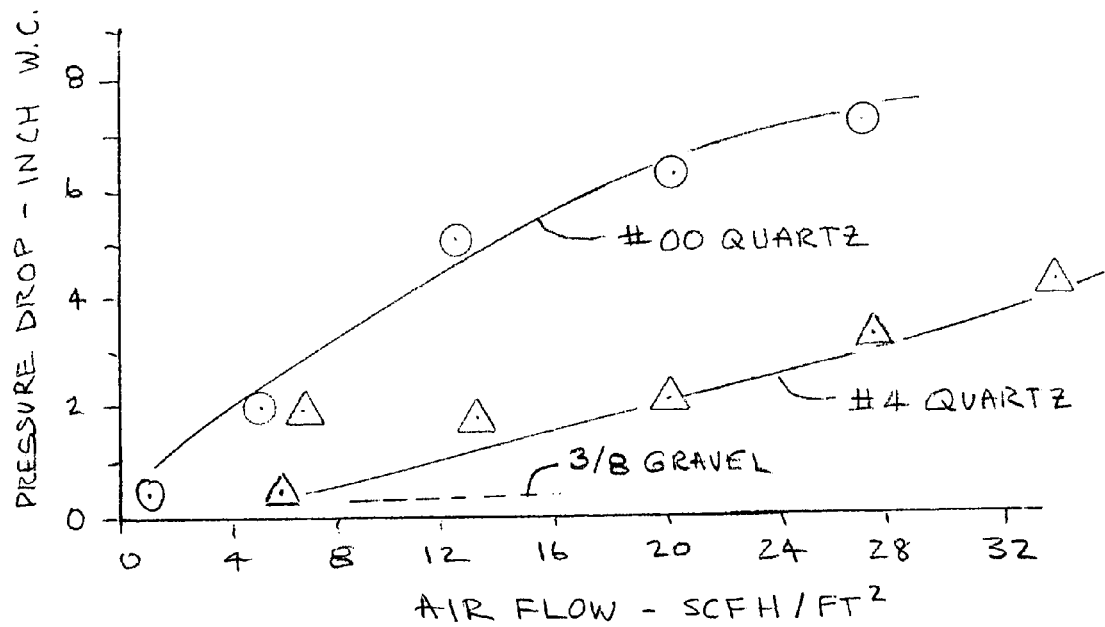
FIG. 5 graphically illustrates how filter bed airflow rate changes with differential pressure and medium size.

Air was flowed through 12-inch deep beds of Filpro No. 00 and Filpro No. 4 medium, which had been used for months in processing wastewater, generally in accord with Example 1. Air was also flowed through clean ⅜ inch stone medium, which could represent a trickling bed. The graph of FIG. 5 shows how the resistance or pressure drop of media to airflow significantly vary as a function of sizing, and how flow rate varies with pressure drop across the bed.

EXAMPLE 5

Wastewater was flowed over 24 hours in 4 equally spaced doses through a 12 inch deep bed of Filpro No. 00 medium, at two different flow rates, 3 and 10 gpd/ft2. The top of the beds were vented to atmosphere. After an about one hour pause subsequent to dosing, air was pulled continuously at 9 cfh through the bed by means of suction beneath the bed. A comparison bed had no induced airflow. The data in Table B show how good BOD5 reduction was obtained from both wastewater flow rates with air flow, whereas less BOD5 removal was obtained when there was no air flow.

TABLE B

Effect of flow rate and airflow on BOD5 change of common wastewater in a 12 inch deep, one square foot cross section, 12 inch deep Filpro No. 00 quartz medium bed.

|  | 9 cfh airflow | 9 cfh airflow | No air flow |
| --- | --- | --- | --- |
| Flow rate gpd/ft$^2$ | 3 | 15 | 3 |
| BOD$_5$ at inlet | 500 | 500 | 500 |
| BOD$_5$ of discharge | 24 | 54 | 240 |

A preferred process for treating wastewater, to reduce biological oxygen demand and achieve corollary effects, comprises alternating periods of air flow with periods of quiescence, in the intervals between dosing. When the air and water flow method is used with medium having special properties, superior treatment results along with greatly reduced need for maintenance or replacement of the bed. The following details the intermittent or discontinuous airflow process.

First, a dose of wastewater is put on top of a media bed. Then, when the water dosing ends, the bed is allowed to drain by gravity, as it will. With certain of the invention mediums, and when the water quantity is sufficient, water discharges from the bottom of the bed, and then will substantially slow, to small tendrils or dripping. At this point, the bed will still retain a substantial quantity of water, owing to its properties, detailed below. The retained water at least will include water dispersed within the interstices and as a film on the medium, and may include perched water at the bottom of the bed. It may also include water ponded on top of the bed.

Measurement of the BOD of the water just discharged from the bed shows that good treatment has taken place, even though the time of passage for the bulk of the water through the bed seems short. This is attributed to the condition of the bed, which resulted from having performed the very same cycle described here, previous to the present dose of wastewater.

Second, after an optional wait of about 15 to about 120 minutes, differential air pressure is applied to the bed, to cause air to flow downwardly through the bed. The airflow initially causes a portion of the retained water to discharge from the bed bottom, whether or not any was ponded or perched. Air flows from the bottom of the bed as well. Then, the flow of air is stopped.

A pause of at least about 15 minutes, and up to an hour or more, then ensues. It is felt that the cessation of airflow enables water remaining in the bed to redistribute within the bed, into preferential channels through which air had selectively flowed. During the rest period, oxygen in the air which had been flowed in to the bed can be used by the resident microbes.

Third, air is flowed downwardly through the bed again. That causes a further portion of said retained water to discharge from the bed bottom immediately. Then the water flow rate quickly decays in volume.

Fourth, the air flow may be stopped again for a period to time, and then resumed again, as in the second and third steps, so that further drainage of the bed takes place. Even more air cycles may be repeated. Finally, a new dose of water is added to the bed, and the whole larger process cycle starts again.

During the process cycle the gas composition, in particular the oxygen content within the water of the bed and within the effluent water may be measured. For instance, it can be an aim to maintain the oxygen content within the water in the bed in the range of about 4 to about 10 ppm. This can be attained in any particular bed by limiting the amount of wastewater or increasing the flow rate of air, or frequency of air flow cycle. And of course, the process can be controlled by measuring the BOD or other constituents in the wastewater and bed effluent.

The special character of the medium, when in a bed of three inch thick or more, is now described in more detail. Generally, a disclosed medium is categorized as sand, namely, a particulate material having preponderance of particles with sizes in the range of about 0.15 to about 4.8 mm (No. 200 to No. 4 US Sieve Series), more preferably in the range of about 0.15 to about 1.4 mm (No. 200 to No. 14 US Sieve Series). One embodiment of the disclosed medium is distinct from gravels, which have particle sizing greater than about 4.8 mm and less than about 76 mm; and of course it may be distinct from the medium of trickling beds, which is comprised of larger pieces, frequently pieces which are specially formed or molded. Unless otherwise specified herein, terms such as sand or gravel do not limit the composition of matter which makes up the disclosed medium.

In the invention, the bed may be comprised of mixtures of different media. When there is coarse aggregate medium included, beyond the ranges just mentioned, in one embodiment, at least about 50 weight percent of mixture will be sand having the desired special character. A preferred medium, at least for small scale apparatus, is the Filpro Well Gravel, a quartz silica sand, in particular those sizings between Filpro No. 00 and Filpro No. 4. Filpro Well Gravels are supplied by U.S. Silica Company, Berkley Springs, W.V., US. Despite the producer's naming, the material by conventional nomenclature is sand, not gravel. Mixtures of the foregoing media can be used in practice of the invention, for example equal parts of Filpro No. 00 and Filpro No. 4. Since they are clean and rather uniformly sized the Filpro materials serve well in experiments, as examples of the invention. However, particularly if the quantity is large, cost can be high. Thus, more common and less precisely sized medium may be used, provided the medium has properties which are set forth herein for the invention medium.

Briefly, the preferred medium of the invention, when in bed form, has one or more of the following properties. Table C provides some representative data.

1. The saturated hydraulic conductivity $K_{sat}$, is between about 0.4 and about 50 gpd/ft$^2$ (about 50 to about 6300 ft/day), more preferably, between about 0.4 and about 20 gpd/ft² (about 50 to about 2600 ft/day); and most preferably, between about 0.4 and about 5 gpd/ft² (about 50 to about 650 ft/day). These ranges exclude sands which have great amounts of fines, or are too coarse.

2. When the medium is saturated and then gravity drained, the then-moist medium will comprise at least a certain percent water (moisture) by weight, namely at least about 5%, preferably at least about 10%, more preferably at least about 20%. The medium may be further characterized as discharging more water, when air is flowed through drained medium.

3. When water is flowed into a bed, it does not drain fully from the bed, but a portion remains as perched water at the bottom of the bed. For example, there will be at least about one inch perched water table. Again, see Table C for some representative properties.

4. After thorough dosing/wetting, followed by draining for about one hour, with airflow downward at the rate of about 10 to about 20 scfh/ft² the bed will exhibit an average pressure gradient in the range of about 0.1 and about 4 inch water column per inch of bed depth.

The foregoing medium properties are in differing degrees inter-related, being in good part dependent on features which include shape, composition, texture, and wetability; along with the size and shape of the interstices between the particles of the medium. A preferred medium, Filpro Well Gravel No. 00, is mentioned in many examples. It is quartz sand having a "sub-round" particle shape, and a particulate size predominantly in the range about 0.29 to about 0.59 mm (35-50 mesh U.S. Sieve Size), with a uniformity coefficient of about 1.5. The material has a specific gravity of about 2.65, or about 165 lb/ft³, and a compacted bulk density of about 95 to about 98 lb/ft³, which represents a specific gravity of about 1.5. The Mohs hardness is about 7.

The medium is characterized above and below in several different ways, with respect to how it functions in a bed used in the invention process. That does not mean the medium must be always used in the way it is capable of functioning, in carrying out the process of the invention. To elaborate further on medium properties which are summarized above:

1. A first way of characterizing the medium is in terms of saturated hydraulic conductivity, $K_{sat}$. $K_{sat}$ is the inverse of resistance of the granular medium, or matrix, to water flow. Darcy's Law states the fundamental relationship involving $K_{sat}$ as:

$$Q/At = -K_{sat} dH/dz \qquad \text{Equation 1}$$

where Q is quantity of water, A is cross sectional area, t is time, and dH/dz is hydraulic gradient, or driving force. In one disclosed embodiment, the medium has a saturated hydraulic conductivity, $K_{sat}$, between about 10 and about 30,000 gpd/ft²; more preferably between about 100 and about 25,000 gpd/ft²; and, most preferably, between about 1,000 and about 15,000 gpd/ft². For reference, Filpro medium which have such $K_{sat}$ are finer than Filpro No. 2. See Table C for other information. Hydraulic conductivity is measured by a falling head test: In particular, a 12 inch deep bed in a 3 inch diameter tube is overwhelmed with water. The inflow is stopped, and the time for the visible top of column of water to move down through the bed, for instance, from the 10 inch level to the 2 inch level, is measured.

The correlation of property with effectiveness of the invention medium is demonstrated by the data presented, especially that in Table C. Wastewater having a BOD5 content of about 180 mg/l, typical of much domestic wastewater, was flowed onto a one foot deep bed at about 55 deg F., according to the following schedule: Flow at 3 gpd/ft² in four equally spaced doses. Each dose was followed by a one hour pause, then airflow for 30 minutes, then rest for one hour, then air flow for 30 minutes, until the end of hour six, when the next dose was applied. The effluent BOD5 was measured using conventional wastewater laboratory techniques. The data are shown in the third column of Table C, and plotted as a function of hydraulic conductivity in FIG. 6.

TABLE C

Properties of medium beds

| MEDIUM | Hydraulic conductivity | | Effluent BOD5 MG/L | PWT INCH | Weight Weight % Water Retained |
|---|---|---|---|---|---|
| | 1000 gal/day/sq ft | Ft/day | | | |
| 3/8 inch pea stone | 1,297,735 | | 154 | | 3 |
| Filpro No. 4 | 40,800 | | 66 | 0 | 5 |
| Filpro No. 2 | 21,371 | | 8 | | 9 |
| Filpro No. 1 | | | | <1 | 10 |
| Filpro No. 0 | | | | 2 | 12 |
| Filpro No. 00 | 7,470 | | ≦2 | 5 | 22 |
| Sandy loam | 2,250 | | ≦2 | | |
| 50/50 No. 00/No. 4 | | | | | 17 |

Figure 6:
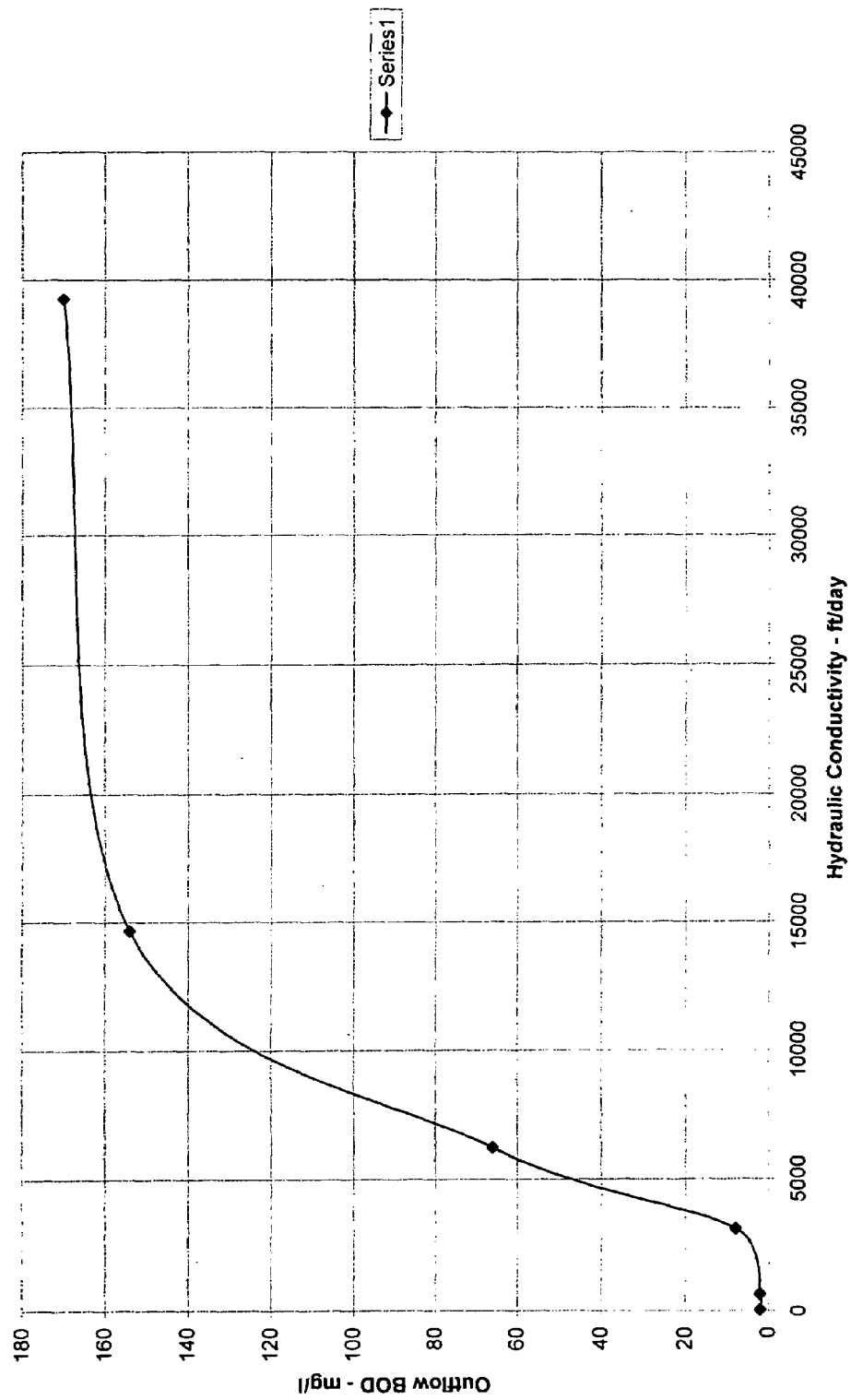
FIG. 6 is a graph showing how hydraulic conductivity of an aerated medium affects BOD5 removal rate.

At least 50 percent reduction in BOD, is considered significant and in some instances is acceptable. This was achieved with the Filpro 4 medium, having $K_{sat}$ of about 6300 ft/day. (Typically, it is the final BOD, which is an aim. For example, for example, a target might be 20 mg/l. That could be achieved with a 50% reduction when the inflow BOD is weak.) FIG. 6 shows that very good treatment, with greater than 95 percent removal, is achieved when Hydraulic Conductivity ($K_{sat}$) is about 2600 or less, which is associated with Filpro No. 2 and finer medium. From the table, it can be seen how PWT approximately correlates with $K_{sat}$.

2. A second way of characterizing the special properties of the medium is: The medium is saturated, then gravity drained for one hour. The weight of water retained is compared to the weight of medium and water by heating and drying the medium. The water content is expressed in terms of weight or mass percent. In one embodiment, the disclosed medium will retain at least about 5 percent, more preferably at least about 10%, most preferably at least about 20% by weight water.

The desired water content retained by the medium will importantly preserve a bountiful culture of microorganisms in the bed, and will be a receptor for absorption of oxygen during the time of airflow, so the oxygen is available in connection with a new dose of wastewater. The amount of water retained by the medium when it drains is a function of the particle size and other properties mentioned above. The far right column of Table C shows the moisture retention characteristics of the selected media.

Of course, high water retention is not by itself a good characteristic, since clays and the like can retain a lot of water, yet they would not have sufficient conductivity to enable sufficient water and air flow, and they would be prone to clogging due from organic matter, even when air flow through the bed is attempted in accord with the invention.

A sub-category of this property is that the medium has the property of releasing a significant quantity of water, upon air flow of about 10 scfh/ft$^2$, as exemplified by Table A and the related discussion.

3. A third way of characterizing medium is in terms of its ability to perch water. Perched water can be understood as follows: Suppose the bottom of a bed of certain desired medium is closed off and the entire bed is filled with water. When the bottom is opened, the upper portion of the bed drains, but the lower portion of the bed is found to remain saturated with water, which water is called perched water. The same perch water will be found when a substantial quantity of water is dumped onto the top of an open bottom bed of special medium, after substantial flow out the bottom ceases, i.e., in a matter of minutes after dosing. If the bed is left idle, slow draining (dripping) may continue over a period of many hours, even days, according to the particular medium. Ultimately, the water content approaches what is commonly referred to as field capacity. As an example, in a 12 inch deep bed of the aforementioned Filpro No. 00 sand, the perched water will be about 5-6 inch deep. Surfactants or oils in the water, can influence perched water depth.

Referring back to FIG. 1, the height at the top of the saturated medium, which is the level of perched water, is also called the perched water table. The depth of the perched water, d, is measured from the bottom surface of the medium bed 20 to the elevation of line PWT. The location of PWT can be seen visually when the chamber has transparent walls, which is how measurement was made here, about 10 minutes after substantial flow out the bottom ceased. Such data are approximate, since the precise level is somewhat vague and uneven. The level PWT may also be determined by probing the bed with a piezometric-potentiometric surface type probe.

Medium that is too coarse will not hold perched water. Experiments with ordinary water and other virgin Filpro quartz medium show that size No. 00 provides about 5 to about 6 inch depth perched water; coarser size 0 provides about 2 inch; still coarse size 1 provides none to barely any; and size 4 provides none. The data are in Table C. Mixtures of fine and coarse material will tend to provide lesser perched water depths than do the fine material by itself. In some embodiments of the invention, the more preferred medium is of a character such that virgin medium, under static, no airflow conditions, provide a water table of at least about one inch, using the foregoing measuring procedure. In the generality of the broad invention, the medium may or may not hold perch water; for example virgin Filpro No. 4 does not. However, with time, inorganic and organic matter and microorganisms buildup and colonize the Filpro No. 4, after which perching can occur. Ponding on the surface of the bed of Filpro No. 4 can also form in a similar manner.

4. A fourth way of characterizing the preferred medium is that, when air is flowed through the bed, there will be a pressure gradient which is high compared to non-sand medium, such as used in trickling beds, and low compared to silt containing medium. In the preferred medium, with air flow between about 10 and about 20 scfh, the average pressure gradient per inch of depth is between about 0.1 and about 4 iwc. As examples, for an exemplary 12 inch deep bed, a 2 inch pressure drop provides a gradient of about 0.16; an about 10 inch pressure drop provides a gradient of about 0.83; and, an about 20 inch pressure drop provides a gradient of about 1.7, all iwc.

The foregoing properties of medium used in the invention are measured when the medium is new and clean. Or, if the medium has been used, the measurement of characteristic is only done when the medium is free of any substantial organic build up, which can greatly affect the apparent properties. (With the optimal air flow in the invention, with normal wastewater, there will be no build up over time, sufficient to cause a problem. However, if for some reason a bed should become clogged for any reason, it can be cleaned by backwashing and other known techniques. Alternatively, a strong oxidizer, such as ozone or hydrogen peroxide, may be flowed into and through the bed; or, of course, the medium can be replaced.)

A fifth way of characterizing the media is that when water is applied on to the bed, water will pond on the surface of the bed. This can be a function of the selected media and/or the manner in which the surface of the bed is managed. The ponding level above the bed will be impacted by accumulation of inorganic and organic matter and by colonization by microorganisms. A media that initially has too high of a hydraulic conductivity, can be loaded with wastewater in such a manner as to accumulate a layer of the above mentioned matter, and it will serve to provide beneficial ponding during the desired interval. This resultant layer can also be physically or mechanically worked deeper into the bed if desired with a rake, fluid action or similar devices to help enhance perching of water when desired. The goal of ponding water on top of the bed is to minimize oxygen transfer during the anoxic denitrification process. By maintaining a continuous film of water over the bed, the oxygen transfer rate is significantly diminished from 21% oxygen content of air to the solubility of oxygen in water, which is approximately 21,0000 times less. For instance, A dose of 1 inch of water is applied to the surface of the media bed. After approximately 45 minutes, the end of the anoxic cycle, there is 0.25 inches of water remaining on the bed.

Other medium than the high quality Filpro quartz sands may be used in the practice of the invention. Preferably, the alternate medium will be a non-metal inorganic material, such as common silica sand, perlite (siliceous volcanic rock), or other simple or complex metal oxide ceramic—irrespective of whether any is crystalline or glassy. The other medium will have characteristics to accomplish the process of the invention as does the preferred medium. The medium may be comprised of other materials, such as soil, coal, peat, and wood. In special cases, plastic or wood medium may be used; and, any tendency to float may be inhibited by a suitable grid or net on the top of the bed. Additives can be incorporated within the medium, to interact with the wastewater directly or provide a catalytic oxidation enhancing effect, as are taught in the prior art.

In an alternative embodiment, a carbon source material, that is a carbon containing reactive compound, such as charcoal or vegetable matter, which material is dispersed within the sand medium or the bed, or preferably, deployed as a layer underlying the medium. The principles described in provisional patent application Ser. No. 60/520,422 "Open Bottom Reactor", in particular those described in connection with FIG. 8, may be employed. The disclosure of said application is hereby incorporated by reference. Alternatively, other carbon sources such as methanol, can be added in a liquid form to facilitate denitrification. Another beneficial process is to recirculate a portion of the water that has passed through the aerated media bed back to the headworks of the treatment system, septic tank or other processing vessel. This can serve to provide an additional carbon source and anoxic conditions.

The invention can operate in at least two modes: a pressurized chamber mode which is described first; and an un-pressurized chamber-mode which is described second.

Wastewater and air are forced to flow together through a bed of media by being introduced into an open bottom chamber. The preferred chamber typically has a dome shape top like that shown in FIG. 7, to resist pressure within the chamber and to provide an efficient structure for resisting weight of overlying soil. Pressurized air is introduced into the top end of the chamber, and forced to flow downwardly toward the open bottom of the chamber. Consequently, there is an upward pressure and buoyant force on the chamber. As will be described, the media bed is either wholly or partly within the chamber, or directly beneath the open bottom of chamber.

The media of the bed is comprised of particulates. One sand media is Filpro No. 00 sand (U.S. Silica Company, Berkley Springs, W.Va.). Another is fill specified by regulatory authorities for small domestic subsurface sewage systems, for example "select fill", described in "Design Manual—Subsurface Sewage Systems for Households and Small Commercial Buildings", State of Connecticut Department of Public Health (July 1998). In some instances, common native sandy soil is suitable. Still other alternative media may comprise perlite, or artificial ceramic, glass or plastic pieces. As described below, in some instances, the media may be comprised of peat, wood, charcoal, foam and fabric material. An example of such a mixed media is by volume percent about 20% peat, about 10% perlite, about 10% vermiculite, and about 60% sand.

Figure 7:
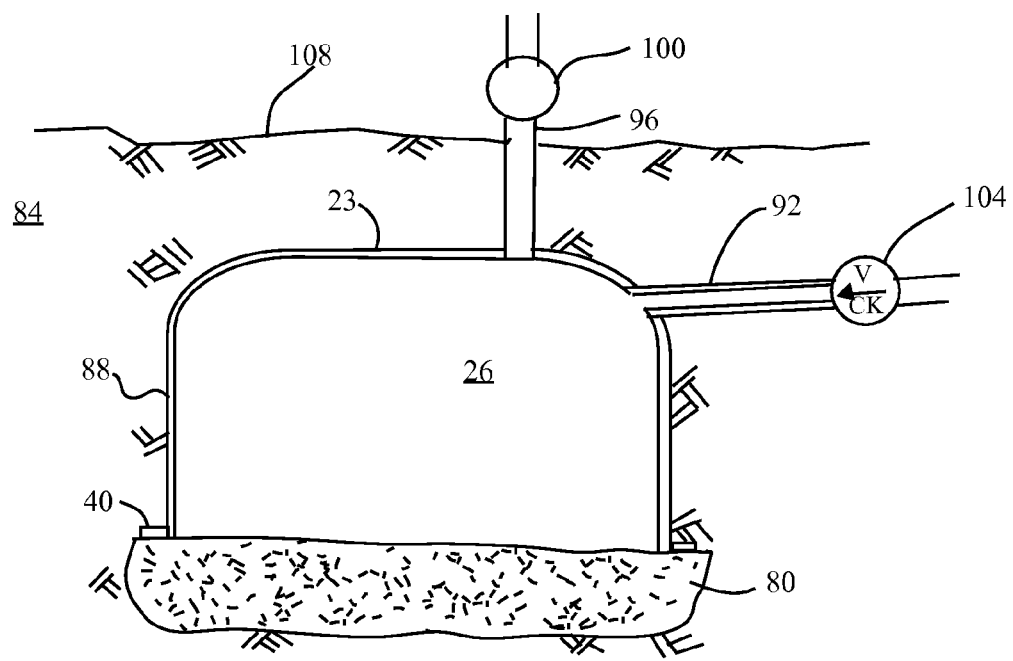
FIG. 7 is an embodiment of the disclosed apparatus.

In one embodiment, illustrated by FIG. 7, the apparatus is comprised several elements. A bed 80 of media is placed in the bottom of the excavation in the soil 84 of the earth. Dome shaped chamber 88 rests on the media bed 80 and the chamber is covered over with soil. During use, wastewater enters the upper portion of the chamber by means of inlet line 92. The water falls onto the bed. There is a suitable splash plate or other means, not shown, laid on the media surface near the inlet pipe, to prevent erosion of the top of the bed by the falling wastewater. Air or other active gas from a blower or other suitable source is delivered to the chamber by means of air line 96 having valve 100. Check valve 104, or a substitutional upstream water trap in the wastewater line, prevents the air from flowing back up the wastewater line, and thus forces air to flow through bed 80. In the various other embodiments that are described below, these same features will be preferably employed, although for simplicity they are not repetitively shown.

In one mode of operation of the FIG. 7 apparatus, air flows downwardly through the media bed 80 along with the wastewater, to the bottom of the bed. The wastewater then percolates into the underlying soil to be dispersed. To the extent the water fills the bottom of the media bed and there is air pressure within the chamber, the air will help force the water into the soil. Air that is forced downwardly to the bottom of the chamber and through the bed 80, infiltrates into the soil, and flows in a diffused way, upwardly to the soil surface 108 and to atmosphere above, except to the extent constituents in the air react with the wastewater and other matter within the media and soil.

In the FIG. 7 embodiment and the various other embodiments described here, the following additional feature may be added. A system of drains or catch pans can underlie the media bed or be contained within the bottom of the media bed. Thus, the water running downwardly through the bed can be collected by the drains, from which it may be pump-recirculated to an upstream primary treatment device or to the inlet pipe of the chamber. The same kind of under-drain or other collection pipes may be used to collect air after it has flowed through the media, either to ease its return to atmosphere, or so the air may be used for other wastewater treatment purposes, ancillary to the essential apparatus which is presently being described The air pressure applied to the chamber will be whatever is sufficient to achieve the desired downward flow and biological result within the media. Typically the air pressure will be low, in the range about 1 to about 20 inch water column. While the air pressure in the chamber may be low, since the cross sectional area of the chamber will tend to be large, there can be a substantial upward force on the chamber due to the bottom of the chamber being open. For example, if the chamber is 6 feet in diameter, the upward force is about 1500 pounds when there is about 10 inch water column air pressure in the chamber. Such an upward force is significant, particularly if chamber is constructed of steel or plastic, such as high density polyethylene, which is light weight. Further, there can also be a buoyant force on the chamber that must be resisted, should the surrounding soil become flooded or saturated with water.

Figure 8:
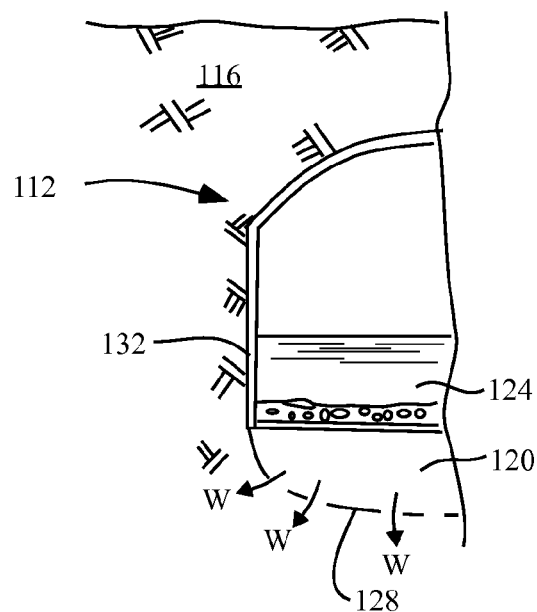
FIG. 8 is another embodiment of the disclosed apparatus.
Figure 9:
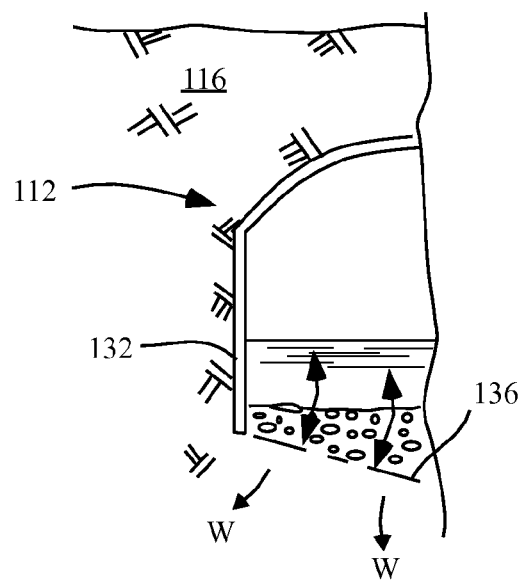
FIG. 9 is the apparatus of FIG. 8 after much of the wastewater has been drained.

FIG. 8 and FIG. 9 illustrate an alternative embodiment of the invention, wherein the apparatus is configured very much like that just described, but the chamber is operated in un-pressurized mode. By "un-pressurized mode" is meant that there is no blower or equivalent, to provide pressurized air. Yet, in this mode of the invention, there may be some gas pressure generated in the chamber by action of wastewater being introduced into the chamber and media bed. This gas pressure can be further enhanced by installing a check valve, actuated valve, water trap or similar functioning device on the vent to atmosphere. The check valve is configured to be closed when the wastewater is introduced into the chamber to create an enhanced pressure gradient, and opens when the water moves downwardly through the media to draw in air. In one unpressurized mode, flow is induced by first saturating the media, and then allowing it to drain, on a repetitive basis. The embodiment can be best understood by comparing it with prior art devices which do not carry out the invention. Also new is apparatus for treating wastewater comprises an un-pressurized chamber, that is, one which is not provided with air from a pressurizing source. The chamber 112 of FIG. 8, is buried in the soil 116 (although it will be understood burying is not necessary, as previously described). The chamber 112 has a vent line to atmosphere and a wastewater inlet line, both unshown. In this example of the invention, the media 120 at the bottom of the chamber 112 interior, and below, is a portion of soil 116. Other media may be used. The soil/media in the example is well drained permeable soil. In use, a substantial dose of wastewater is introduced into the chamber, followed by cessation of flow, while the soil drains for a period of time. Then, another dose introduced into the chamber.

FIG. 8 shows the chamber as it appears after dosing. The chamber 112 contains a substantial quantity of ponded wastewater 124, which has risen to a particular water level. This ponded wastewater serves to seal off the media bed surface from the oxygen in the air, for enhanced denitrification. The ponded anoxic water slug moves downwardly through the media, creating temporary anoxic conditions; then air is drawn behind it. The water is slowly infiltrating into the media beneath the chamber by natural processes, e.g., the gravitational head of the water and the capillarity of the soil. The progression of the flow of water through the soil is schematically indicated by a dotted line showing the water front 128 and associated flow direction arrows W. In FIG. 8, the chamber sidewall lower portion 132 has no perforation.

In FIG. 9, the chamber 112 is shown after water has largely drained away. Trailing end boundary 136 schematically indicates the last of the water mass that can drain, i.e., excluding residual water which will be retained in small pores and films. As the water drains, most of the voids in the interstices of the media are filled by air, according to a normal process, since there cannot be a vacuum present. The airflow is indicated in the Figures by arrows A. As air is drawn into the soil, there is a very small negative pressure in the chamber that results in atmospheric air being drawn through the vent line, and the check valve opening if present. In the invention apparatus, FIG. 9, the air cannot flow through the sidewall 132. It follows the water flow through the bottom of the chamber.

Were the chambers to process only clean water, and never wastewater, then the permeability of the soil media would not tend to change significantly with time, and the invention would provide no benefit. However, wastewater carries organic material and it can accumulate in the media. Thus, the advantage of the invention is realized with the passage of time because of the improved airflow. The explanation is as follows. If the amount of oxygen and biological activity are insufficient, then the permeability of the media, and the capacity of the system, will become progressively diminished. This usually happens in a traditional wastewater leach system. Thus, a system designer will take the progressive degradation into account by providing the system with sufficient soil cross sectional area so it will function in a stable degraded condition.

In a virgin system, the water preferentially flows downwardly rather than sideways, given the greater force of gravity head of the water at bottom of the chamber. Suppose this for FIG. 10B; and that the media at the bottom of the chamber becomes naturally slightly clogged. When that clogging occurs, the water "sees" an easier flow path—through the sidewall perforations. Since the airflow follows the draining water flow, with time less air will be drawn or forced through the bottom. Thus, the media at the chamber bottom will become increasingly clogged. Increasingly, the water flows through the sidewall, into soil at perforations higher and higher up the chamber sidewalls. Ultimately, all the soil through which water can flow reaches equilibrium permeability, which might be quite low.

In the invention illustrated by FIGS. 8 and 9, the water and induced airflow is always downward. Thus, clogging of the media at the bottom of the chamber—both within the confines of the un-perforated sidewall and just below—will be ameliorated because with the passage of time there is relatively more airflow than in the prior art configuration. The water and air cannot take an easier path. Thus, air must be drawn into the media where the organic material has been deposited. When the air is drawn in, favorable conditions for its elimination are created.

Of course, the media in the invention apparatus can become degraded in permeability and clogged, if the organic matter flowed into the media is too much for the airflow. But since the airflow through the media bottom is greater than in the prior art, the sustained wastewater capacity of the media is also greater. When systems are designed according to the long term equilibrium condition of the media at the bottom of the chamber, the invention provides for a smaller surface area for any given flow.

The option which the wastewater has for migration in flow path, which engenders the quicker and greater degradation of the media at the bottom of the chamber, is not present. In the invention, with respect to media at the exterior of the chamber, which is above the lowest end of the chamber, there is no lateral flow. Substantially, the water flows downwardly.

Different variations in configuration, which have been described for the pressurized chamber, may be applied to the un-pressurized chamber. In general, there will not be a need for the flange and other features that are aimed at keeping the chamber from rising from the soil. A control valve may replace the check valve in the wastewater inlet line, or other means may be used, to ensure dosing. Desirably, the media should be allowed to drain or a sustained time, e.g., hours. In many applications, the nature of the source will inherently provide dosing. While a blower is not needed to force air into the soil, if decomposition gases from any source tend to accumulate in the chamber, it may be desirable to provide a small fan or other air mover, to flow fresh air into the chamber.

In one embodiment, the disclosed apparatus comprises a chamber having and upper portion and a lower portion which define a chamber interior; the lower portion is comprised of impermeable sidewalls which define a downward facing opening having a horizontal cross section area; media, contained within the lower portion of the chamber interior, within the confines of the impermeable sidewalls, to substantially fill said the horizontal cross section area; means for introducing wastewater into the top portion of the chamber so the wastewater flows downwardly through the media; and, means for providing atmospheric air to upper portion of the chamber, above the media; so that, when water is periodically dosed into the chamber, the water saturates said media, and then drains from the media to thereby induce flow of air from the upper portion of the chamber or the lower portion of the chamber. In one mode, the air line and water line have check valves or equivalent functioning devices, so that dosing by a substantial quantity of water produces gas pressure inside the chamber. In another mode, a chamber has a top which is permeable but resistive to air flow, for instance due to being overlaid by soil; and, periodic dosing with water causes air to flow in and out of the chamber through the top.

Other procedures are useful in the practice of the invention. For example, some air can be flowed continuously through the bed, and water may be flowed onto the bed as doses or continuously. In such a case, the perched water may not be established. However, the medium for such bed is still chosen so that water would perch in the absence of the continuous airflow. The comparative flow rates of the air and water are more critical when they are simultaneous, since the air can travel down preferred pore space channels in the bed, adjacent to channels in which the water flows, and the desired bed treatment efficiency will not be achieved. Thus, when continuous air flow is used, the water ought to be applied uniformly to the top of the medium bed, and the airflow velocity will be kept in the lower end of the ranges, indicated above.

In a wastewater treatment process, as in natural systems, ammonia not used for biosynthesis first undergoes nitrification, an aerobic process wherein ammonia is oxidized to nitrite, thence to nitrate, as shown in Equation 2.

$$NH_4^+ \rightarrow NO_2^- \rightarrow NO_3^-$$ Equation 2.

Nitrification is carried out by bacteria such as Nitrosomonas and Nitrobacter. Much of the energy released through this process is used to reduce $CO_2$ for the formation of organic matter: a constant rejuvenation of the nitrifying community.

At this stage, the treatment process may be reversed by harnessing another natural process, denitrification.

Denitrification is an anaerobic process wherein nitrate is reduced to nitrite, thence to elemental nitrogen, which then may be liberated to the atmosphere, see Equation 3.

$$NO_3^- \rightarrow NO_2^- \rightarrow N_2O\uparrow \rightarrow N_2\uparrow \qquad \text{Equation 3}$$

It is important to note that, although some denitrification can occur aerobically, it occurs intensely under anaerobic conditions. Therefore, by maintaining anaerobic conditions (often termed "anoxic" if nitrate is available) at this phase of treatment, the disclosed wastewater treatment process can remove the maximum amount of nitrogen from the waste stream. Key participants in this process include many facultative anaerobic bacteria such as those in the genera, *Pseudomonas, Achromobacter* and *Escherichia*. By harnessing and intensifying these natural processes, the wastewater treatment process can significantly decrease nitrogen concentrations from the waste stream.

Figure 10:
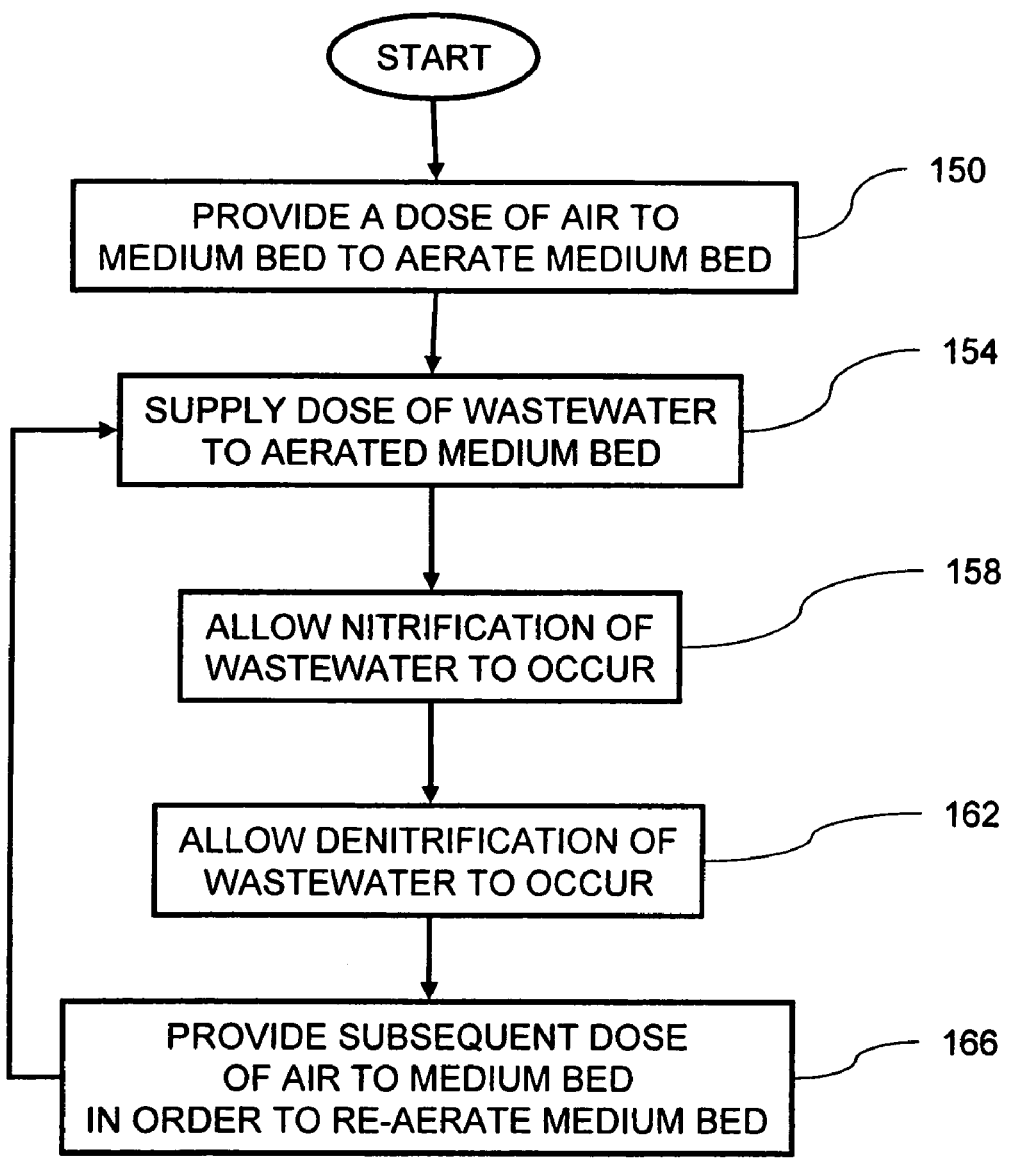
FIG. 10 is a flowchart illustrating an embodiment of the disclosed method.

Thus FIG. 10 illustrates a disclosed method of treating wastewater. At act 150, a dose of air is provided to a medium bed in order to aerate the medium bed. The bed may be of any known beds currently used for the treatment of wastewater, or the disclosed beds discussed above. The dose of air may be air or oxygen, or air with a higher than usual oxygen content. The dose may be provided by some sort of air or oxygen pump, blower, fan, or any device which can direct air and/or oxygen to the bed. At act 154 a dose of wastewater is supplied to the aerated medium bed. The dose may be supplied via a valve that allows wastewater to the bed, or a pump which pumps wastewater from a holding container to the bed. The dose should be for an approximate known volume of wastewater. Water may be dosed to the bed such that the wastewater will pond on the surface of the bed for a period of time. This may lead to improved anaerobic treatment of the wastewater at act 162. At act 158, nitrification is allowed to occur in the bed, whereby ammonia is ultimately converted to nitrate in a generally aerobic process. At Act 162, denitrification of the wastewater is allowed to occur. At this point, air or oxygen is not externally provided to the bed, since denitrification is generally an anaerobic process. At act 166, a subsequent dose of air is provided to the medium bed, to aerate the medium bed. The bed needs aerating due to the fact that the nitrification process and displacement due to the volume of water, has de-aerated the bed. Additionally, air should be provided to the bed, even if the next dose of wastewater is not due for many hours, days, or longer. This is because the microorganisms that assist in the nitrification process may die if there is not enough oxygen in the system for them Additionally, the subsequent dose of air may dewater the bed. In one embodiment, the doses of air provided to the bed move in the same direction as the dose of wastewater. Such directional movement of the air improves water treatment.

Although this invention has been shown and described with respect to preferred embodiments and certain variations, it will be understood by those skilled in this art that various changes in form and detail thereof may be made without departing from the spirit and scope of the claimed invention.

It should be noted that the terms "first", "second", and "third", and the like may be used herein to modify elements performing similar and/or analogous functions. These modifiers do not imply a spatial, sequential, or hierarchical order to the modified elements unless specifically stated.

While the disclosure has been described with reference to several embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiments disclosed as the best mode contemplated for carrying out this disclosure, but that the disclosure will include all embodiments falling within the scope of the appended claims.

What is claimed is:

1. A method for treating wastewater comprising:
   blowing a first dose of air into a volume of generally liquid water-free space located above a medium bed;
   supplying a dose of wastewater to the aerated medium bed;
   allowing nitrification of the wastewater to occur;
   allowing denitrification to occur; and
   blowing a subsequent dose of air into the volume of generally liquid water-free space located above a the medium bed.

2. The method of claim 1, wherein the providing a subsequent dose of air occurs after an amount of time has elapsed since the supplying a dose of wastewater.

3. The method of claim 2,
   wherein the dose of wastewater is about 0.3 gallons times the surface area of the bed (ft$^2$) to about 6.7 gallons times the surface area of the bed (ft$^2$).

4. The method of claim 2, wherein the amount of time is about 15 minutes to about 4 hours.

5. The method of claim 1 further comprising:
   providing at least one dose of air to the medium bed such that microorganisms in the bed that assist in nitrification of the wastewater are not adversely affected.

6. The method of claim 1, wherein the first does of air is about 2 to about 40 scfh/ft$^2$ for about 15 minutes to about 4 hours.

7. The method of claim 1, wherein the subsequent dose of air is about 2 to about 40 scfh/ft$^2$ for about 15 minutes to about 4 hours.

8. The method of claim 1, wherein the subsequent does of air is about 8 to about 60 scfh/ft$^2$ for about 15 minutes to about 4 hours.

9. The method of claim 1, further comprising, after supplying a dose of wastewater to the aerated medium bed:
   ponding water on the surface of the bed for a period of time.

10. The method of claim 1, wherein the medium bed is aerated such that oxygen makes up at least 10% by volume of gas located at the interstices of the medium.

11. The method of claim 1, wherein the medium bed is aerated such that oxygen makes up at least 15% by volume of gas located at the interstices of the medium.

12. The method of claim 1, wherein each dose of air moves in the same direction as the dose of wastewater.

13. The method of claim 1, further comprising:
    dewatering the media with the subsequent dose of air.

14. A combined aerobic and anaerobic treatment apparatus comprising:
    a medium bed;
    a volume of generally liquid water-free space located above the medium bed;
    a wastewater conduit in fluid communication with the medium bed;

an air conduit in fluid communication with the medium bed; and wherein the combined aerobic and anaerobic treatment apparatus is configured to (a) blow a first a dose of wastewater into the volume of generally liquid water-free space located above the medium bed, and then (b) allow the first dose of wastewater to undergo a nitrification process which is generally aerobic, and then (c) allow the first dose of wastewater in the medium bed to undergo a denitrification process which is generally anaerobic.

15. The combined aerobic and anaerobic treatment apparatus of claim 14, wherein the medium bed is located in a container; and wherein a wastewater exit conduit is in fluid communication with the medium and in fluid communication with a leech field.

16. The combined aerobic and anaerobic treatment apparatus of claim 14, wherein the medium bed is located in an open bottomed container; and wherein the medium bed is in fluid communication with soil underlying the open bottomed container.

17. The combined aerobic and anaerobic treatment apparatus of claim 14, further configured to pond wastewater at the surface of the medium bed for a period of time.

18. The combined aerobic and anaerobic treatment apparatus of claim 14, further configured such that the dose of air moves in the same direction as the dose of wastewater.

19. The combined aerobic and anaerobic treatment apparatus of claim 14, further comprising an air mover in fluid communication with the medium bed and configured to provide a dose of air to the medium bed.

20. An apparatus for treating wastewater comprising:

means for blowing a first dose of air into a volume of generally liquid water-free space located above a medium bed;

means for supplying a dose of wastewater to the aerated medium bed;

means for allowing nitrification of the wastewater to occur;

means for allowing denitrification to occur; and means for blowing a subsequent dose of air into the volume of generally liquid water-free space located above the medium bed.

21. The apparatus of claim 20, wherein each dose of air moves in the same direction as the dose of wastewater.

* * * * *